United States Patent
Chang et al.

(10) Patent No.: US 10,178,028 B2
(45) Date of Patent: Jan. 8, 2019

(54) CALL ADMISSION CONTROL AND PREEMPTION CONTROL OVER A SECURE TACTICAL NETWORK

(71) Applicant: Nytell Software LLC, Wilmington, DE (US)

(72) Inventors: Kirk Chang, Morganville, NJ (US); Gi Tae Kim, Morristown, NJ (US); John Unger, Bud Lake, NJ (US); John Sucec, Piscataway, NJ (US); Sunil Samtani, East Newark, NJ (US)

(73) Assignee: Nytell Software LLC, Wilmington, DE (US)

( * ) Notice: Subject to any disclaimer, the term of this patent is extended or adjusted under 35 U.S.C. 154(b) by 0 days.

(21) Appl. No.: 15/233,156

(22) Filed: Aug. 10, 2016

(65) Prior Publication Data

US 2017/0155588 A1 Jun. 1, 2017

Related U.S. Application Data

(63) Continuation of application No. 13/104,489, filed on May 10, 2011, now Pat. No. 9,438,516, which is a
(Continued)

(51) Int. Cl.
*H04J 3/14* (2006.01)
*H04L 12/801* (2013.01)
(Continued)

(52) U.S. Cl.
CPC ............ *H04L 47/10* (2013.01); *H04L 47/11* (2013.01); *H04L 47/245* (2013.01);
(Continued)

(58) Field of Classification Search
CPC ........ H04L 47/10; H04L 47/11; H04L 47/115; H04L 47/15; H04L 47/127
See application file for complete search history.

(56) References Cited

U.S. PATENT DOCUMENTS 5,719,854 A 2/1998 Choudhury
5,845,279 A 12/1998 Garofalakis
(Continued)

OTHER PUBLICATIONS

McCann et al. ; "A measurement based approach for multilevel admission of heterogeneous traffic in wireless ad-hoc networks" pp. 1-4.*

(Continued)

*Primary Examiner* — Andrew W Chriss
*Assistant Examiner* — Kenan Cehic
(74) *Attorney, Agent, or Firm* — Fitch, Even, Tabin & Flannery LLP

(57) ABSTRACT

In a secure network where the network characteristics are not known, a call admission control algorithm and a preemption control algorithm based on a destination node informing the source node of the observed carried traffic are used to regulate the amount of traffic that needs to be preempted by the source. The amount of traffic that needs to be preempted is based on the carried traffic measured at the destination node. The traffic to be preempted is based on the priority of the traffic, where the lowest priority traffic is the first to be preempted until the amount of traffic preempted is sufficient to allow the remaining traffic to pass through the network without congestion.

12 Claims, 4 Drawing Sheets

Related U.S. Application Data continuation of application No. 11/116,512, filed on Apr. 28, 2005, now Pat. No. 7,957,276.

(51) Int. Cl.
  *H04L 12/851* (2013.01)
  *H04L 12/927* (2013.01)
  *H04L 12/911* (2013.01)

(52) U.S. Cl.
  CPC ...... *H04L 47/2408* (2013.01); *H04L 47/2433* (2013.01); *H04L 47/70* (2013.01); *H04L 47/805* (2013.01); *H04L 47/822* (2013.01)

(56) References Cited

U.S. PATENT DOCUMENTS

| | | | |
|---|---|---|---|
| 5,903,558 | A | 5/1999 | Jones |
| 5,920,571 | A | 7/1999 | Houck |
| 6,041,239 | A | 3/2000 | Reed |
| 6,081,513 | A | 6/2000 | Roy |
| 6,215,772 | B1 | 4/2001 | Verma |
| 6,317,584 | B1 | 11/2001 | Abu-Amara |
| 6,738,819 | B1 | 5/2004 | Li |
| 6,816,462 | B1 | 11/2004 | Booth, III |
| 6,956,821 | B2 | 10/2005 | Szviatovszki |
| 7,257,083 | B2 | 8/2007 | Bansal |
| 7,957,276 | B2 | 6/2011 | Chang |
| 9,438,516 | B2 | 9/2016 | Chang |
| 2001/0050901 | A1 | 12/2001 | Love |
| 2001/0052011 | A1 | 12/2001 | Nagao |
| 2002/0009092 | A1 | 1/2002 | Seaman |
| 2002/0129138 | A1 | 9/2002 | Carter |
| 2002/0141345 | A1 | 10/2002 | Szviatovszki |
| 2002/0165970 | A1 | 11/2002 | Ludewig |
| 2002/0181394 | A1 | 12/2002 | Partain |
| 2003/0072318 | A1 | 4/2003 | Lam |
| 2003/0101263 | A1* | 5/2003 | Bouillet ............... G06Q 50/06 709/225 |
| 2003/0152029 | A1 | 8/2003 | Couturier |
| 2003/0193395 | A1 | 10/2003 | Ahiska |
| 2004/0143850 | A1 | 7/2004 | Costa |
| 2004/0156313 | A1 | 8/2004 | Hofmeister |
| 2004/0223500 | A1 | 11/2004 | Sanderson |
| 2005/0002364 | A1 | 1/2005 | Ozer |
| 2005/0063400 | A1 | 3/2005 | Lum |
| 2005/0083849 | A1 | 4/2005 | Rui |
| 2005/0094628 | A1 | 5/2005 | Ngamwongwattana |
| 2005/0117512 | A1 | 6/2005 | Vasseur |
| 2005/0177749 | A1 | 8/2005 | Ovadia |
| 2005/0188089 | A1 | 8/2005 | Lichtenstein |
| 2005/0226400 | A1 | 10/2005 | Farber |
| 2005/0249186 | A1 | 11/2005 | Kelsey |
| 2006/0047775 | A1 | 3/2006 | Bruck |
| 2006/0120282 | A1 | 6/2006 | Carlson |
| 2006/0120361 | A1 | 6/2006 | Sharma |
| 2010/0011118 | A1 | 1/2010 | Chang |

OTHER PUBLICATIONS

Dec. 12, 2008 Office Action for U.S. Appl. No. 11/116,512.
Feb. 5, 2008 Office Action for U.S. Appl. No. 11/116,512.

* cited by examiner

CALL ADMISSION CONTROL AND PREEMPTION CONTROL OVER A SECURE TACTICAL NETWORK

CROSS-REFERENCE TO RELATED APPLICATIONS

This application is a continuation application of U.S. patent application Ser. No. 13/104,489, filed May 10, 2011, now issued as U.S. Pat. No. 9,438,516 on Sep. 6, 2015, which is a continuation of U.S. application Ser. No. 11/116,512, filed on Apr. 28, 2005, now issued as U.S. Pat. No. 7,957,276 on Jun. 7, 2011, all of which are incorporated by reference herein.

GOVERNMENT LICENSE RIGHTS

This invention was made with Government support under DAAB07-01-C-L534 awarded by U.S. Army—CECOM. The Government has certain rights in this invention.

FIELD OF THE INVENTION

The present invention relates generally to management of the quality-of-service and access control of the network backbone in a secure wireless network. Specifically, the invention concerns call admission control and preemption control over a secure tactical network.

BACKGROUND OF THE INVENTION

In a secure tactical network there are a number of access networks interconnected by an encrypted backbone. Information exchange is not allowed across the access and backbone boundary. In order to manage the quality of service, controlling access to the backbone, which is often limited in bandwidth resource, is needed.

Military wireless networks carrying heterogeneous traffic with multiple levels of survivability present a challenging admission control problem. These unique challenges include: encryption boundaries that prevent communicating the state information known on the WAN (backbone) side to the LAN where admission control is implemented; and the capacity of wireless links that can change with time (fading or mobility) that cause the available network resources between a source node and a destination node to fluctuate requiring an adaptive admission technique that avoids overloading the wireless links.

In one prior art solution to the problem, the General Dynamics Corporation C4S's Measurement Based Admission Control (MBAC), a feedback mechanism is used in which a congestion indicator, identified as "severity level", is sent from the destination to the source to regulate traffic. However, the severity level alone is insufficient for the source to adequately regulate the network traffic. The severity level is used to allow the source to infer the congestion status and then to determine the calls that belong to a particular DSCP (Differentiated Services Code Point) to preempt. This approach is only a first step for regulating traffic into the network. The congestion level is not a critical piece of information for the source. The amount of traffic that has to be preempted is the most important information to the source. Often, due to a lack of precise information with regard to how much traffic needs to be preempted, or how much bandwidth is still available, the MBAC framework relies on a "trial-and-error" technique, making the method very slow to react.

One of the main features of the invention is the intelligent usage of the available bandwidth estimates of a tunnel across a black network, while the network is congested. "Available bandwidth" is defined as the amount traffic that has been successfully sent, or equivalently, the carried traffic. A "tunnel" is defined as a pair of source and destination red enclaves which send and receive traffic to and from the black network. These bandwidth estimates are used by the Call Admission Control (CAC) engine to regulate traffic into the tunnel. A "black network" as used herein is a secure (encrypted) wireless network that handles encrypted traffic.

When the tunnel is under-loaded, i.e. the offered traffic is less than the maximum amount of traffic the tunnel can carry, if the "headroom bandwidth" of the tunnel, which is defined as the amount of bandwidth that can be used by new traffic, is available through estimation techniques, the CAC engine can selectively admit forthcoming traffic into the network without overloading the black network while protecting the higher priority traffic. If the "headroom bandwidth estimate" is not readily available to the CAC engine, the calls can be admitted into the network, and the second part of the framework, which deals with overload conditions, will be triggered to force the system into a stable state in a speedy manner.

The presence of cross-over traffic which is originated and admitted from other nodes into the network and utilizes the same bottleneck link or degraded RF conditions can cause the tunnel to be congested or overloaded. When overload occurs, the amount of offered traffic injected into the tunnel is larger than the amount of traffic the tunnel can carry. In accordance with the teachings of the present invention, the amount of carried traffic is measured and provided to the CAC engine. The CAC engine selectively preempts the appropriate flows to ease the overload condition, in a manner such that higher priority traffic flows are protected.

There still exists a need for call admission control and preemption control over a secure tactical network where a source node located in the LAN transmits packets through a secure black backbone (WAN), in which data are encrypted, to a destination node located in another LAN. Due to security concerns, there is virtually no information about the WAN that can be sent to the source or destination nodes. Accordingly, it is very difficult to manage the end-to-end Quality-of-Service in this type of network architecture. The present invention provides a solution to overcome this problem.

In order to overcome the limitations found in the prior art and to improve the network performance the present invention provides a method so that source is aware quantitatively of the amount of traffic that needs to be preempted during periods of congestion.

SUMMARY

The present invention calculates the amount of traffic that needs to be preempted by the source. Preemption of calls is necessary to ensure that the remaining calls have a satisfactory Quality-of-Service (QoS) and the number of calls to be preempted is determined by the congestion level as well as the requested bandwidth of the existing calls. The present invention solves the problem by use of a call admission algorithm and a preemption algorithm based on the destination node informing the source node of the observed carried traffic. The source node is informed of the amount of traffic that needs to be preempted. Using this crucial information, the source can quickly and precisely move the network operation to the correct "operating point". The novel algorithms result in improved throughput (the number of calls that can be supported) performance.

A principal object of the present invention is therefore, the provision of a novel method and system for improving throughput performance of a network.

Another object of the present invention is the provision of a call admission control algorithm for measuring the traffic into and out of network and preempting traffic when the network is congested.

A further object of the invention is the provision of a preemption control algorithm for preempting traffic based on network congestion and available bandwidth into and out of the network.

Further and still other objects of the present invention will become more clearly apparent when the following description is read in conjunction with the accompanying drawings.

DETAILED DESCRIPTION

Figure 1:
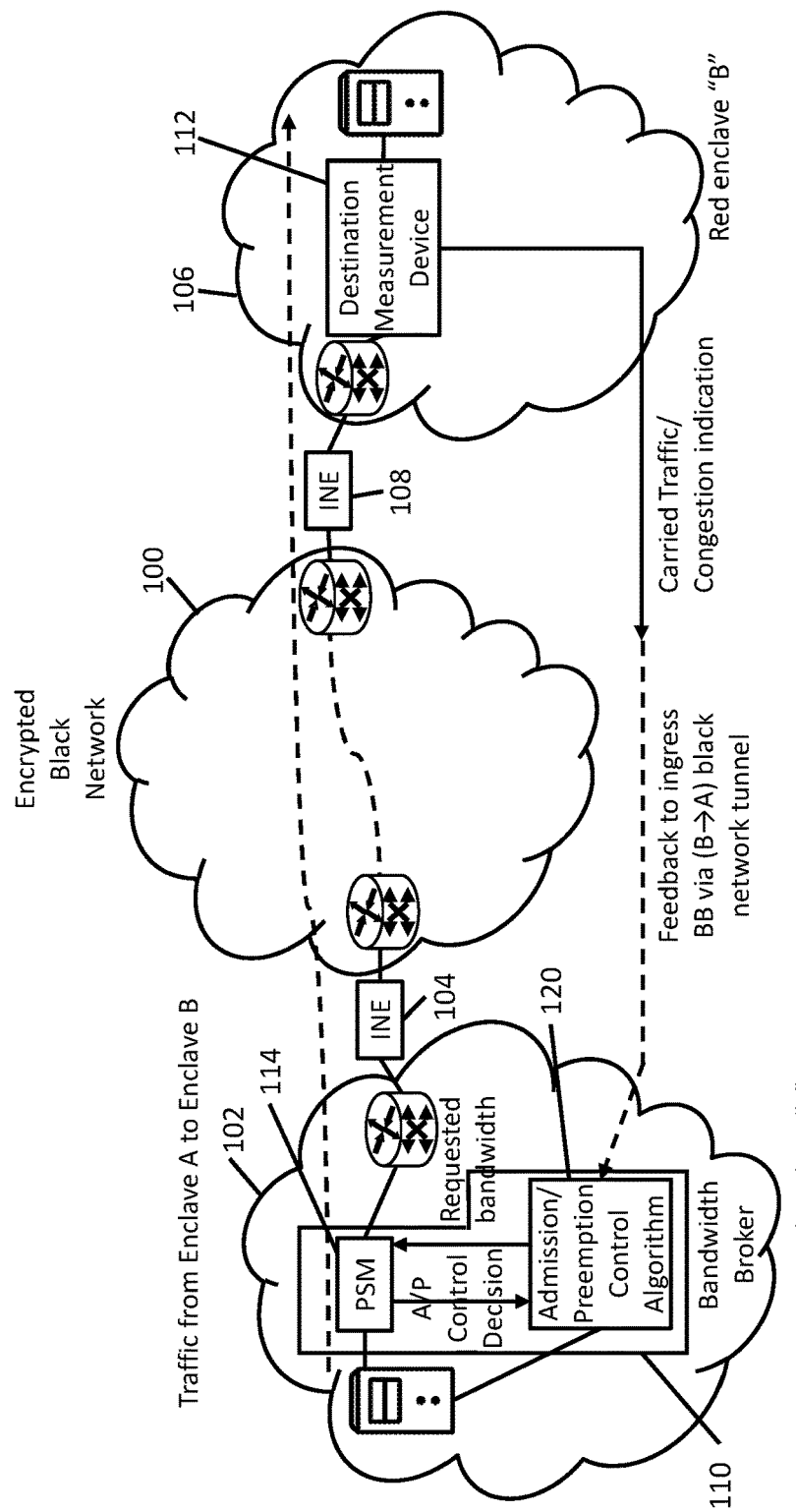
FIG. 1 is a schematic block diagram of a red/black network using destination control.

Referring now to the figures and to FIG. 1 in particular, there is shown a schematic block diagram of a typical battlefield red/black network using destination measurement. In FIG. 1 the backbone (black) network 100 is a secure (encrypted), wireless network. At the access red enclave "A" network 102, and black network 100 tunnel ingress point and at the red enclave "B" network 106 and black network 100 tunnel egress point, there are respective encryption devices (In-line Network Encryptor) 104, 108. A standard bandwidth broker (BB) structure 110, i.e. before sending traffic into the black network, an application in the red enclave "A" or network 102 makes a request to the BB for the amount of bandwidth needed. The BB runs a call admission control algorithm 120 to determine if the call can be admitted.

Red enclave "A" 102 and red enclave "B" 106 are typically wired-line networks, and both are physically confined in a controlled area (e.g. a division headquarter). Hence, there is typically no need for encryption for traffic flowing within the red enclaves. When data needs to be transmitted from one red enclave to another distant red enclave, the data is typically sent over a wireless medium which is subject to hostile enemy interception and jamming. Therefore, right before data is sent over the wireless medium, for example when traffic is being sent from enclave "A" to enclave "B", the data is encrypted using an encryption device (Inline Network Encryptor (INE)) 104, such as a HAIPE (High Assurance Internet Protocol Encryptor) device At the receiving end, the data is decrypted by decryption device 108, such as a HAIPE device, and sent into the secure destination red enclave "B" 106. The encrypted network 100 between two encryption devices is usually referred as the "black network".

The wireless black network 100 has only wireless links with limited bandwidth and very dynamic characteristics, i.e. the bandwidth of a wireless link can experience tremendous fluctuations due to adverse RF conditions and/or jamming. Modern military operations demand a sophisticated Quality-of-Service (QoS) management regime to satisfy the underlying diverse loading profile (i.e. voice, data and video, etc), QoS requirements and priority management (e.g. MLPP (Multi-Level Precedence and Preemption)) However, due to security concerns, there is virtually no information about the black network that can be sent across the encryption device into the red enclaves. Hence, the black network has to be treated by the red enclaves as a true "black box". These considerations make the QoS management over the red/black network very challenging.

In an effort to devise a comprehensive solution for providing adequate QoS control over the red-black network a Destination Measurement Device 112 is deployed. The Destination Measurement Device 112 uses the observations from the QoS attributes of the live traffic that are collected at the destination red-enclave to compute the carried traffic per DSCP. These carried traffic observations are then processed for call admission control. The algorithms implemented in the Destination Measurement Device 112 assume no knowledge about the black side network characteristics (e.g. topology, link BW, router configuration, etc).

In the case of packets sent from red enclave "A" 102 to red enclave "B" 106 through black network 100, before leaving the source red enclave "A" 102 an ingress time stamp and a packet sequence number are written into data packets by the PSM (Policer/Shaper/Marker) device 114. At the destination enclave "B" 106, using the ingress time stamp the per packet end-to-end delay is obtained. The end-to-end delay and the packet sequence number are then used as input data for Destination Measurement Device 112.

Destination Measurement Device 112 has two main functionalities. First, it estimates the carried traffic, i.e. the amount of traffic that has been successfully sent through the black network, or the available bandwidth. Secondly, it detects if the tunnel is in a congested state, by comparing the observed packet loss and packet delay with a set of preset thresholds.

The algorithms may be stored in a memory device and used by a computing device to run the algorithms in conjunction with a communications system.

The results obtained from Destination Measurement Device 112 are provided back to the BB 110 for Call Admission Control and Preemption Control 120. Before traffic is sent into the black network 100, a request is made BB 110. Based on the results from the Admission/Preemption Algorithm 120 the call is either admitted or denied by BB 110. In addition, for flows that have already been admitted, based on the feedback from Destination Measurement Device 112, the Admission/Preemption Algorithm 120 may preempt some of the calls in order to protect higher priority traffic.

Admission/Preemption Control algorithm 120 will now be described in detail.

Figure 2:
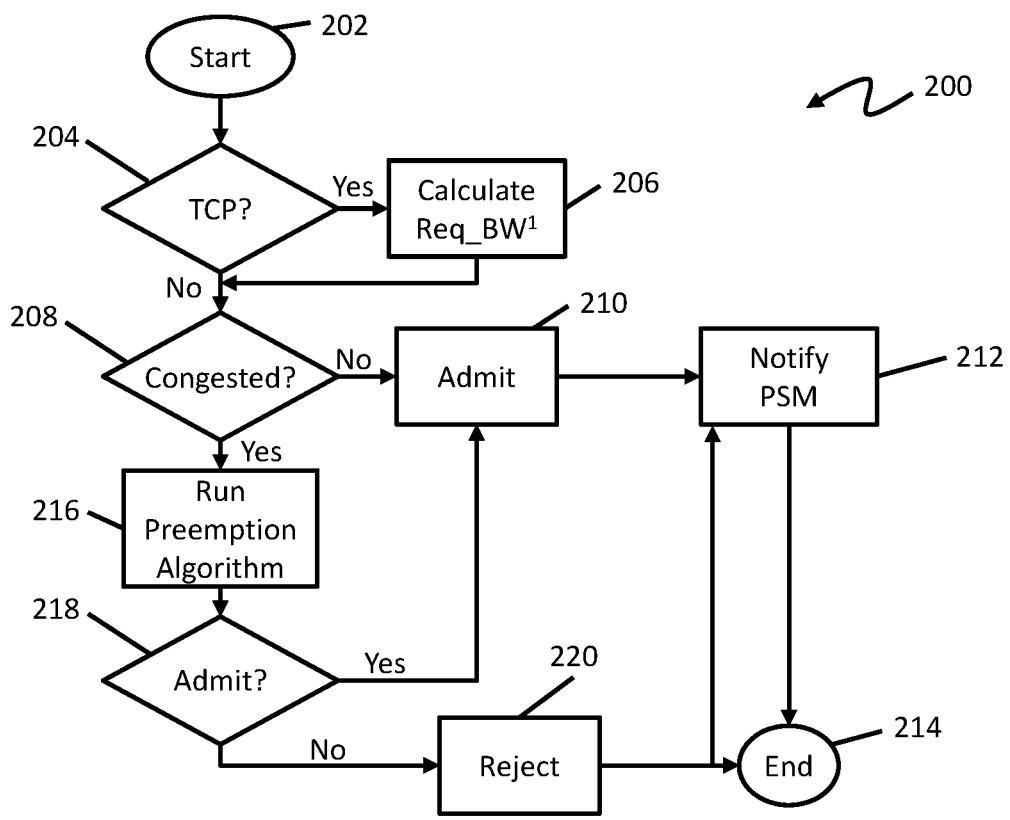
FIG. 2 is a flow chart of a bandwidth estimation algorithm and a call admission control algorithm without headroom bandwidth estimate information.
Figure 4:
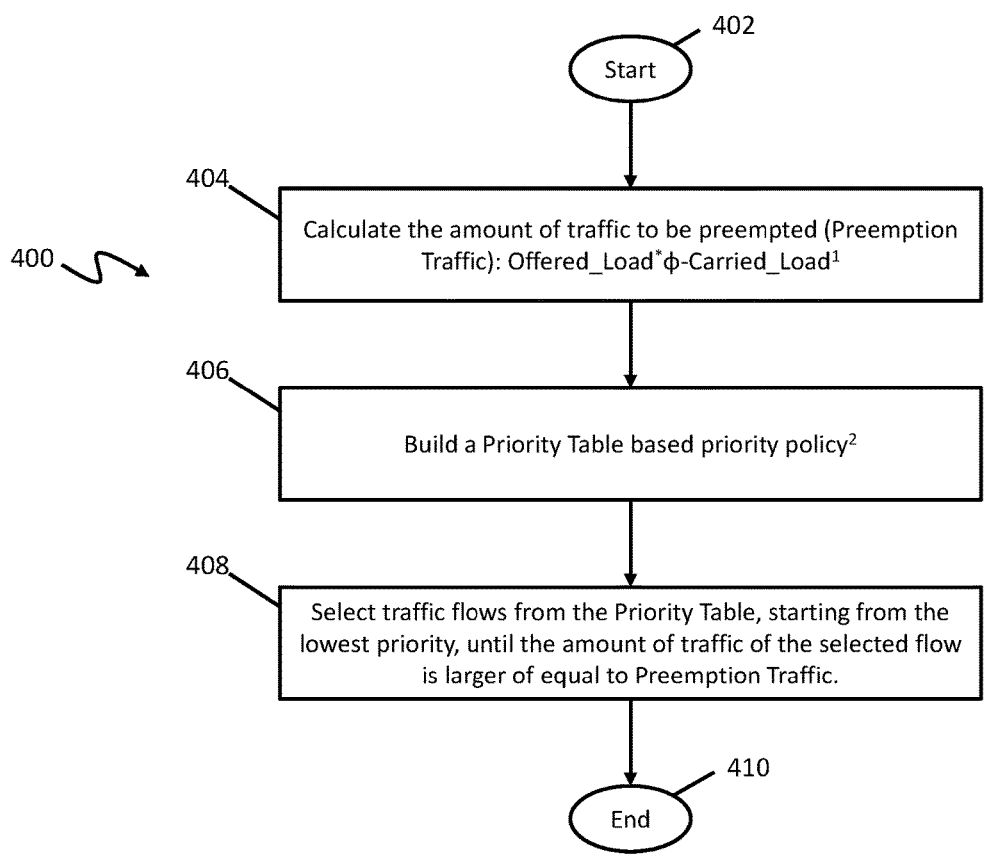
FIG. 4 is a flow chart of a preemption control algorithm.

FIG. 2 is a flow chart of a call admission control (CAC) algorithm 200, assuming no headroom bandwidth estimate is available. That is, the CAC algorithm examines whether the network is already in a congested mode using feedback from Destination Measurement Device 112. If the network is not in a congested mode the call is admitted. Otherwise, a preemption control algorithm 120 is run to see if some of the existing lower priority calls need to be preempted to accommodate the new call. The preemption control algorithm is shown in FIG. 4.

The call admission control algorithm 200 starts 202 and a determination, is made whether the requesting call uses TCP (Transmission Control Protocol) 204 If yes, there is a calculation of the required bandwidth 206. The required bandwidth is the file size divided by the speed of service multiplied by Θ, which is a tunable parameter, Req_BW=File_size/Speed-of-Service*Θ. If the requesting call uses UDP (User Datagram Protocol), the requested bandwidth is the encoding rate of the coder, and no calculation is needed.

After calculating the required bandwidth or if not using TCP, determine if the network is congested 208. If the network is not congested, admit the call 210, notify the PSM 212 and end the algorithm 214.

If the network is congested, run the preemption algorithm 216 (400). Then, decide whether the call should be admitted 218. If so, admit the call 210 and notify the PSM 212 and end the algorithm 214. If after running the preemption algorithm 216 it is decided that the call should not be admitted, reject the call 220, notify the PSM 212 and end the algorithm 214.

Figure 3:
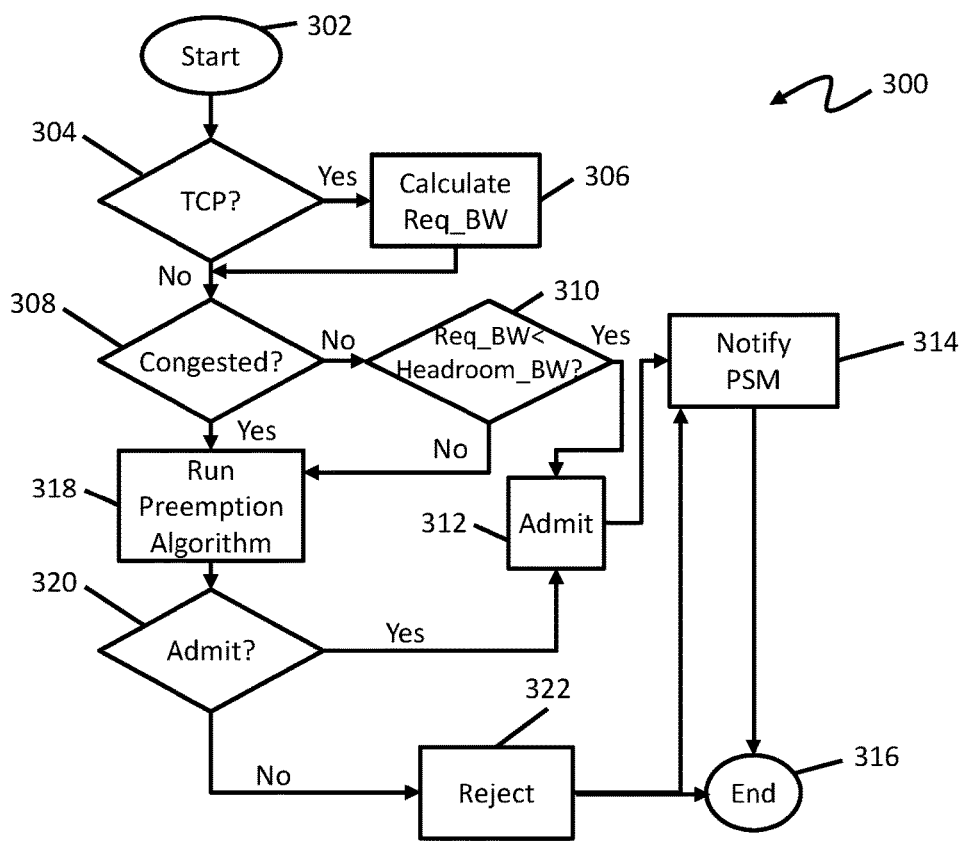
FIG. 3 is a flow chart of a bandwidth estimation algorithm and a call admission control algorithm with headroom bandwidth estimate information.

FIG. 3 is a flow chart of a call admission control algorithm in which the headroom bandwidth estimate data is available. In this case, the CAC algorithm portion checks if the headroom bandwidth is large enough to admit the new call. If not, the preemption algorithm is run such that some of the lower priority calls are preempted.

The Call Admission Control algorithm 300 starts 302. A determination is made whether TCP 304 is used. If yes, calculate the required bandwidth 306.

After calculating the required bandwidth or if the TCP is not used, determine if the network is congested 308. If the network is not congested, calculate if the required bandwidth is less than the headroom bandwidth multiplied by η which is a tunable parameter 310. That is, Req_BW<Headroom_BW*η. If the required bandwidth is less than the headroom bandwidth multiplied by η admit the call 312, notify the PSM 314 and end the algorithm 316.

If the network is congested or if the required bandwidth is not less than the headroom bandwidth multiplied by run the preemption algorithm 318. After running the preemption algorithm, decide if the call should be admitted 320. If yes, admit the call 312, notify the PSM 314 and end the algorithm 316. If the call is not admitted, reject the call 322, notify the PSM 314 and end the algorithm 316.

FIG. 4 is a flow chart of a preemption algorithm. The preemption algorithm 400 can be triggered by CAC when checking if some of the existing low priority calls can be preempted while network is in congested state (steps 216 and 318). The preemption algorithm 400 can also be triggered independently from CAC: when the congested state is declared, preemption algorithm 400 is triggered to preempt low priority calls to protect the high priority traffic. Network congestions can be declared by Destination Measurement Device 112 through QoS measurements (delay, loss, jitter, etc.) exceeding preset thresholds. The preemption algorithm comprises two major steps: determining the amount of the traffic that needs to be preempted 404 and building a priority table 406 (the priority of various calls is determined according to a network policy). The former is the key to obtaining good performance: the amount of the traffic needs to be decided by examining the offered and carried traffic. In FIG. 4, the weighted difference between offered and carried traffic is used to determine the preemption traffic amount. After preemption traffic is determined, individual calls are preempted, starting from the lowest priority calls in the priority table.

The preemption algorithm starts 402 and a calculation is made of the amount of traffic that is to be preempted 404. The preempted traffic is Offered_Load*Φ−Carried_Load, where Offered_Load is obtained from the requested bandwidth from the existing calls, and Φ is a tunable parameter. If the preemption algorithm is called from the CAC, the preemption traffic is Req_BW.

Next, a priority table is built 406 based on a priority policy. An example of a priority table is Offered_load, Carried_load and Preemption Traffic calculated per class. Priority Tables are also built per class based on DSCP precedence. Another example of a priority table is Offered_load, Carried_load and Preemption Traffic calculated per tunnel across classes. The priority across classes is determined by policy (e.g., Precedence "Regular" of AF2 has a higher priority than Precedence "Regular" of EF).

Traffic flows are selected from the Priority Table 408 starting from the lowest priority, until the amount of traffic of the selected flow is equal to or greater than the preemption traffic. Then, the preemption algorithm ends 410.

While the invention has been described in conjunction with a secure (encrypted) network, the invention is applicable to any network through which traffic passes along a path from a source node to a destination node when the characteristics of the network, such as but not limited to topology, link bandwidth, router configuration, etc., are not known.

Having described and illustrated a method and system for improving throughput performance of a network, it will be apparent to those skilled in the art that variations and modifications are possible without deviating from the broad principles and teachings of the present invention which shall be limited solely by the scope of the claims appended hereto.

What is claimed is:

1. A method comprising:
receiving at a network routing computing device from a destination server information regarding calculated carried traffic through a secure network received at the destination server, a state information of the secure network being unknown to the destination server and to the network routing computing device;
determining an estimate of available bandwidth;
calculating at the network routing computing device an amount of traffic to be preempted from a source network associated with the network routing computing device to remove congestion through the secure network, the calculation including at least in part the information regarding the calculated carried traffic and the available bandwidth;
building at the network routing computing device a priority table of traffic to be introduced into the secure network according to a priority policy; and
selecting at the network routing computing device traffic flows from the source network from the priority table starting with the lowest priority until the selected traffic flow is equal to or greater than the calculated amount of traffic to be preempted;
wherein calculating the amount of traffic to be preempted comprises calculating the amount of traffic to be preempted according to Offered_Load *Φ-Carried_Load, where the Offered_Load is equivalent to a requested bandwidth from existing calls, the Carried_Load is equivalent to available bandwidth obtained from successfully sent traffic, and Φ is a tunable parameter.

2. The method of claim 1 wherein the building the priority table comprises building a priority table comprising Offered_load, Carried_load, and Preemption Traffic calculated per class.

3. The method of claim 1 wherein the building the priority table comprises building a priority table comprising Offered_load, Carried_load and Preemption Traffic per tunnel across classes.

4. A non-transitory computer readable medium, having stored thereon that, in response to execution by a device, cause the device to perform operations comprising:
receiving information regarding calculated carried traffic received at a destination server;
calculating an amount of traffic to be preempted from a source network in order to remove congestion through a secure network, the calculation including at least in part the information regarding calculated carried traffic, which is ascertained without state information of the secure network;
building a priority table of traffic to be introduced into the secure network according to a priority policy; and
selecting traffic flows from the priority table starting with the lowest priority until the selected traffic flow is equal to or greater than the calculated amount of traffic to be preempted
wherein calculating the amount of traffic to be preempted comprises calculating the amount of traffic to be preempted according to Offered_Load *Φ-Carried_Load, where the Offered_Load is equivalent to a requested bandwidth from existing calls, the Carried_Load is equivalent to available bandwidth obtained from successfully sent traffic, and Φ is a tunable parameter.

5. The non-transitory computer readable medium of claim 4 wherein the building the priority table comprises building a priority table comprising $Offered_{13}$ load, $Carried_{13}$ load, and Preemption Traffic calculated per class.

6. The non-transitory computer readable medium of claim 4 wherein the building the priority table comprises building a priority table comprising $Offered_{13}$ load, $Carried_{13}$ load and Preemption Traffic per tunnel across classes.

7. The non-transitory computer readable medium of claim 4 wherein receiving at the network routing computing device from the destination server information regarding the calculated carried traffic through the secure network received at the destination server comprises receiving at the network routing computing device from the destination server a carried traffic per differentiated services code point (DSCP) based on information comprises at least one of a ingress time stamp of received packets or a packet sequence of received packets.

8. The non-transitory computer readable medium of claim 4 wherein the operations further comprise notifying a Policer/Shaper/Marker of admitted traffic flows.

9. The non-transitory computer readable medium of claim 4 wherein the operations further comprise notifying a Policer/Shaper/Marker of the preempted traffic flows.

10. A method comprising:
receiving at a network routing computing device from a destination server information regarding calculated carried traffic through a secure network received at the destination server, a state information of the secure network being unknown to the destination server and to the network routing computing device;
determining an estimate of available bandwidth;
calculating at the network routing computing device an amount of traffic to be preempted from a source network associated with the network routing computing device to remove congestion through the secure network, the calculation including at least in part the information regarding the calculated carried traffic and the available bandwidth;
building at the network routing computing device a priority table of traffic to be introduced into the secure network according to a priority policy; and
selecting at the network routing computing device traffic flows from the source network from the priority table starting with the lowest priority until the selected traffic flow is equal to or greater than the calculated amount of traffic to be preempted;
wherein receiving at the network routing computing device from the destination server information regarding the calculated carried traffic through the secure network received at the destination server comprises receiving at the network routing computing device from the destination server a carried traffic per differentiated services code point (DSCP) based on information comprises at least one of a ingress time stamp of received packets or a packet sequence of received packets.

11. The method of claim 10 further comprising notifying a Policer/Shaper/Marker of admitted traffic flows.

12. The method of claim 10 further comprising notifying a Policer/Shaper/Marker of the preempted traffic flows.

* * * * *